United States Patent
Bumgardner

[11] 3,896,390
[45] July 22, 1975

[54] HIGH-SPEED SAMPLER WITH VARIABLE SAMPLE RATE

[75] Inventor: Jon H. Bumgardner, Ridgecrest, Calif.

[73] Assignee: The United States of America as represented by the Secretary of the Navy, Washington, D.C.

[22] Filed: Feb. 11, 1974

[21] Appl. No.: 441,081

[52] U.S. Cl. .................. 328/151; 328/58; 328/108
[51] Int. Cl.² ...................... H03K 5/00; H03K 5/18
[58] Field of Search ............ 328/58, 130, 151, 167, 328/104, 154, 108, 115–117

[56] References Cited
UNITED STATES PATENTS

| | | |
|---|---|---|
| 3,364,466 | 1/1968 | Stine .............................. 328/151 X |
| 3,614,673 | 10/1971 | Kang et al. ...................... 328/151 X |
| 3,714,623 | 1/1973 | Mickler ............................ 328/151 X |
| 3,792,195 | 2/1974 | Wilson et al. .................... 328/151 X |
| 3,815,032 | 6/1974 | Parker et al. .................... 328/151 X |

Primary Examiner—John Zazworsky
Attorney, Agent, or Firm—R. S. Sciascia; Roy Miller; R. W. Adams

[57] ABSTRACT

A digital high-speed pulse sampler wherein the pulse is broken up into small segments and each segment is stored in separate sample-and-hold circuits such that the pulse may be examined in detail by circuitry coupled to the output of the sampler.

7 Claims, 2 Drawing Figures

HIGH-SPEED SAMPLER WITH VARIABLE SAMPLE RATE

BACKGROUND OF THE INVENTION

In the radar field, and many other electronic arts, it is desirable and sometimes necessary to sample the electronic pulses being processed. By so doing, the pulses can be analyzed and examined in detail. All prior systems are limited to a single sampling rate, or to a selectable rate chosen from a small array of distinct sample rates designed into the device, all residing within the limit range of the system.

The present invention samples the pulses by breaking them into small segments and storing each segment separately in individual high-speed sample-and-hold circuits so that each pulse may be examined in detail. The sample rate of the present invention may be continuously varied to overcome the disadvantages inherent in the discreet rate selectable by the prior devices, and is capable of sampling signals up to, such as, 320 MHz using variable sample rates, and up to, such as, 3.3 GHz using constant sample rates.

DESCRIPTION OF THE PREFERRED EMBODIMENT

To analyze radar pulses, each pulse is often recorded on tape as it is received. To do so, the pulse must be stretched to be compatible with the bandwidth limitations of the recorder. In the present invention, the radar pulses are stretched by breaking each of them up into small segments and storing each segment separately in individual high speed sample-and-hold circuits. After each sample-and-hold circuit has received its segment and, thereby, been charged to a voltage value dependent on the segment stored, a multiplexer switches sequentially in a relatively slower fashion from the first to the last hold circuit. Thereby, the wave shape of the processed radar pulse is relatively slowly reconstructed by the multiplexer.

Figure 1:
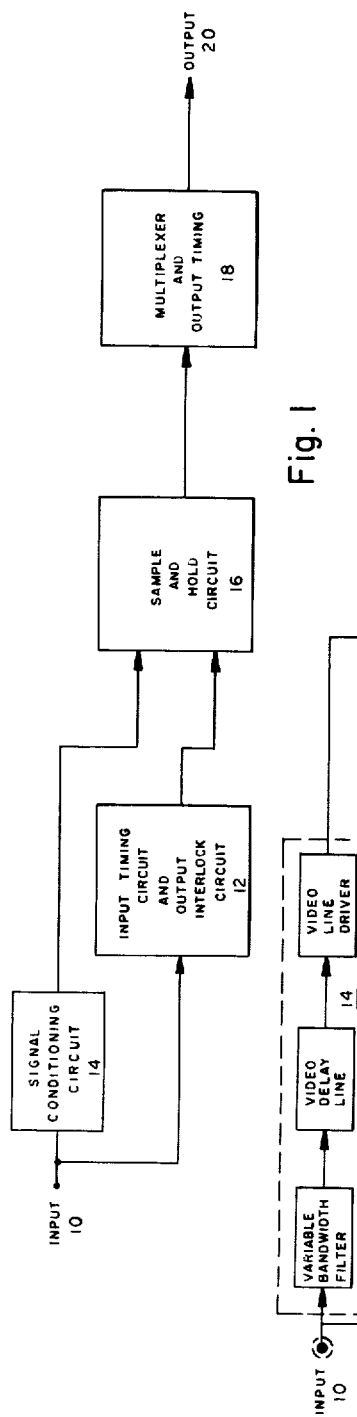
FIG. 1 is a block diagram of the major components of the preferred embodiment of the present invention.

FIG. 1 shows a block diagram of the basic components of the preferred embodiment of the present invention. The logic which directs each pulse segment coupled to input 10 into its appropriate sample-and-hold circuit is the Input Timing Circuit and Output Interlock Circuit 12. The output of the ITC/OIC, and the pulse input which is first prepared by a signal conditioning circuit 14, are both coupled to the Sample-and-Hold Circuit 16, which performs the stretching and storing function mentioned above. The output of the Sample-and-Hold Circuit is coupled to the Multiplexer and Ouptut Timing Circuit 18 which provides the system output by automatically multiplexing the individual sample-and-hold outputs into a single output channel provided as the system output 20. The output may be coupled to a recorder or other analysis device, or may be used for any other purpose in which such a signal is appropriate.

Figure 2:
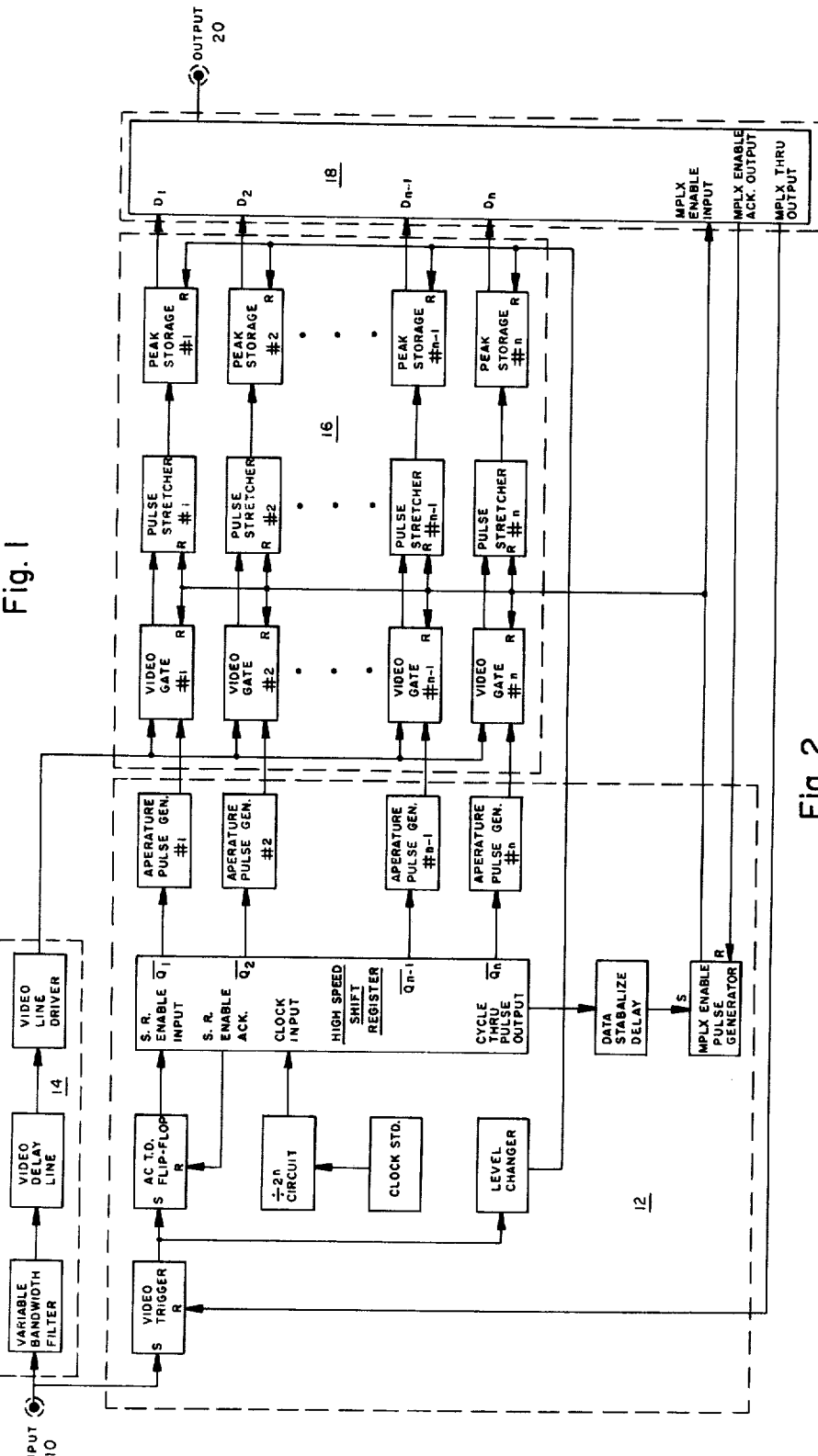
FIG. 2 is a detailed block diagram of the preferred embodiment of the present invention.

A detailed showing of the components of an embodiment of the present invention is shown in FIG. 2. The input to be processed is coupled to the radar video input of the system 10, which is, in turn, coupled to both a variable bandwidth filter of circuit 14 for limiting the aliasing error (see IEEE Spectrum, December 1967 for description of aliasing error), and a video trigger which detects the occurrence of a pulse by comparing its amplitude to a threshold value. The output of the variable bandwidth filter is coupled to a video delay line which delays the pulse a prescribed amount to insure that it and the outputs of the aperture generators are synchronized at the inputs of the video gates. The video line driver coupled to the output of the video delay line drives the distribution network for distributing the pulse to the sampling, i.e., video, gates.

The Input Timing Circuit and Output Interlock Circuit 12 includes the video trigger above described as coupled to the system input. The video trigger has a second input that is coupled from the multiplexer output which notifies the trigger after the multiplexer 18 has completed processing the pulse. Thereby, and only thereafter, the video trigger is reset to accept another pulse. That is, the video trigger will not accept a second pulse until the first is fully processed.

The output of the video trigger is coupled to both a flip-flop and a level changer. When the input pulse exceeds the threshold of the video trigger it provides a step output that initiates the flip-flop, which in turn enables the high-speed shift register. The shift register acknowledges the enablement by resetting the flip-flop to its previous condition in anticipation of the next trigger pulse. The flip-flop may be a tunnel diode flip-flop, for example. The level changer shown is included to insure that the level of the output video trigger is compatible with the peak storage devices used in circuit 16, and that the level stored in the devices is maintained at zero until the video crosses the video trigger threshold to obviate the drift that inherently occurs in such devices. At "trigger" the peak storage devices are "unlocked" to permit them to store the pulse level coupled thereto.

The clock is included for sequencing the operation of the shift register. The divider circuit ($\div 2^n$) provides manual selectability for variable sample rates. The sample rate selected will, in general, be made from a visual interpretation of the input pulse received. That is, the divider circuit can be manually controlled to adjust the sample rate to insure that the entire pulse is sampled. It is contemplated that an automatic arrangement may be included to automatically integrate the input pulse and select the appropriate sample rate. Also, a frequency synthesizer could be used to obtain any desired sample rate within the continuous frequency span up to the 320 MHz upper shift-register frequency limit.

The high-speed shift register may be a typical shift register having a high-speed response capability. ECL logic was chosen for the current applications due to its superior speed characteristics. Each output of the shift register is coupled to an aperture pulse generator which senses the rising edge of the step function coupled thereto, and provides a high level enable pulse to its associated video gate corresponding to the aperture designed for that segment. That is, the pulses provided by generator $l$–$n$ are provided sequentially to corresponding gates $l$–$n$, respectively. The delayed pulse from the video delay line and the video line driver are also coupled to each video gate. As a result, that portion of the input pulse presented to the gates that is concurrent with the pulse provided by generator No. 1 will be coupled through video gates No. 1 to pulse stretcher No.

1. Likewise, that portion of the input pulse that is provided to the gates, and is concurrent with the pulse provided by generator No. 2, will be coupled to pulse stretcher No. 2. Each of the remaining channels designed into the system also couple a portion of the input pulse to their respective pulse stretcher.

The data stabilize delay, and multiplex enable pulse generator, which are coupled to an output of the shift register provide an output which is coupled to the video gates and pulse stretchers of circuit 16 as a reset pulse to stabilize those circuits until they are required to process their next input. The output also enables the multiplexer in a manner similar to that employed by the flip-flop for enabling the shift register. The pulse segments conducted by the video gates would provide fast rising traces including some transient oscillation. The pulse stretchers, however, are somewhat slower rising devices, and will, due to the data stabilization delay, provide a stretched pulse output without the undesirable and nondescriptive transients appearing in the gate outputs. The stretched pulses are coupled to the peak storage devices for storing the pulse value appearing during the respective segment. The output of the storage devices are multiplexed by the multiplexer and output timing circuit which provide the system output 20.

The inclusion of the high speed register is offered by way of example only. For even faster response, a delay line may be substituted for the shift register. If that were done, the divider circuit and clock should be deleted, and a driver circuit could be employed on the output of the flip-flop to drive the delay line.

If you assume we want to observe a radar pulse of 0.1 $\mu$ sec in length, and to divide this pulse into 32 separate segments, we find that the length of each sample segment would be given by $$T = \frac{\text{Pulse Length}}{\text{No. of Samples}} = \frac{10^{-7} \text{ sec}}{32} = 3.1 \times 10^{-9} \text{ seconds.}$$

The frequency that our sample rate generator would have to run would be:

$$f = \frac{1}{T} = \frac{1}{3.1 \times 10^{-9}} = 320 \text{ MHz.}$$

For good output pulse resolution, a resonable aperture time would be 10 to 20 percent of the sample time, or 0.3 to 0.6 nanosecond.

If we assume a tape bandwidth capability of 10 KHz, then our system readout bit rate generator should be on the order of 1 KHz to be capable of recording a tape showing the discrete D.C. levels of our sample-and-hold circuits for computer analysis. Thus, our pulse readout would take 0.032 seconds to record, giving an effective stretch ratio of:

$$R = \frac{\text{Pulse Readout Time}}{\text{Pulse Read in Time}} = \frac{3.2 \times 10^{-2} \text{ sec}}{10^{-7} \text{ sec}} = 3.2 \times 10^{5}.$$

In other words, our pulse would be stretched about 320,000 times its original length.

Other pulse lengths and recording media bandwidth criteria could easily be met by changing either the value of $n$ in the $\div 2^n$ circuit, and/or the multiplexer strobe rate of peak storage outputs.

What is claimed is:

1. A pulse sampler wherein the pulse to be processed is partitioned into segments and the segments are separately stored for retrieval to provide a composite output, comprising:
    an input for receiving at least one electrical pulse;
    means coupled to said input for electronically partitioning said pulse into a plurality of nominally equal valued, sequential segments;
    means coupled to said input for electronically delaying and preparing said pulse for processing;
    means having a plurality of electrical channels equal in number to said plurality of segments, coupled to both said partitioning means and said delaying means for electronically sampling said pulse, wherein each channel samples that portion of the pulse that is coupled thereto simultaneously with a said segment;
    means coupled to each channel for separately storing the maximum value of each sample; and
    means for electronically combining said maximum values from time to time to nominally reconstruct the shape of said pulse such that said pulse can be leisurely examined in detail.

2. The sampler of claim 1 wherein each channel of said sampling means includes a circuit for passing said sample only when gated by a segment of said plurality of sequential segments, and each segment is coupled to a separate channel such that the channels are sequentially gated.

3. The sampler of claim 1 wherein said partitioning means includes a digital shift register providing a plurality of sequential outputs, and a plurality of pulse generators equal in number to said segments, each coupled to said register to receive one of said sequential outputs, wherein said generators provide said sequential segments as outputs to said sampling means.

4. The sampler of claim 3 wherein the output rate of said shift register is selectable to equally space the sequential outputs throughout the span of the pulse.

5. The sampler of claim 4 wherein said sampling means further includes a circuit coupled to each said gate circuit for effectively stretching the sample coupled thereto in time.

6. The sampler of claim 5 wherein said combining means includes a multiplexer for multiplexing said maximum values of each pulse processed.

7. The sampler of claim 6 wherein said sampler includes means for preventing a second pulse from being processed until processing of the prior pulse is completed.

* * * * *